(12) United States Patent
Nilsson et al.

(10) Patent No.: US 11,272,376 B2
(45) Date of Patent: Mar. 8, 2022

(54) METHOD OF PROVIDING AN INCREASE OF COMMUNICATION CAPACITY IN A COMMUNICATIONS SYSTEM

(71) Applicant: Telefonaktiebolaget LM Ericsson (publ), Stockholm (SE)

(72) Inventors: Andreas Nilsson, Gothenburg (SE); Jonas Fridén, Mölndal (SE); Fredrik Harrysson, Gothenburg (SE); Lars Manholm, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 137 days.

(21) Appl. No.: 16/307,716

(22) PCT Filed: Jun. 20, 2016

(86) PCT No.: PCT/EP2016/064175
§ 371 (c)(1),
(2) Date: Dec. 6, 2018

(87) PCT Pub. No.: WO2017/220110
PCT Pub. Date: Dec. 28, 2017

(65) Prior Publication Data
US 2019/0268781 A1    Aug. 29, 2019

(51) Int. Cl.
*H04W 16/18* (2009.01)
*B64C 39/02* (2006.01)
(Continued)

(52) U.S. Cl.
CPC ........... *H04W 16/18* (2013.01); *B64C 39/024* (2013.01); *G05D 1/0022* (2013.01);
(Continued)

(58) Field of Classification Search
CPC ... H04W 16/18; H04W 72/12; H04W 84/045; H04W 84/047; H04W 84/042;
(Continued)

(56) References Cited

U.S. PATENT DOCUMENTS 6,275,187 B1 * 8/2001 Ross ................... H01Q 1/3233
342/175
9,083,425 B1 * 7/2015 Frolov .................. G05D 1/104
(Continued)

FOREIGN PATENT DOCUMENTS

| EP | 1115262 A1 | 7/2001 |
| EP | 2903323 A1 | 8/2015 |

(Continued)

OTHER PUBLICATIONS

International Search Report and Written Opinion of the International Searching Authority, PCT/EP2016/064175, dated Feb. 16, 2017, 9 pages.

*Primary Examiner* — Jeffrey M Rutkowski
*Assistant Examiner* — Sudesh M Patidar
(74) *Attorney, Agent, or Firm* — Sage Patent Group

(57) ABSTRACT

A method of providing an increase of communication capacity in a communications system is disclosed. The method is performed in a network device and comprises: establishing a need for a communication capacity increase in a first coverage area C1, directing an unmanned aerial vehicle comprising an access node towards the first coverage area C1, and providing communication resources by the access node of the unmanned aerial vehicle to meet the communication capacity increase in a first coverage area C1. A method in an unmanned aerial vehicle, a network device, unmanned aerial vehicle, computer programs and computer program products are also provided.

15 Claims, 3 Drawing Sheets

(51) Int. Cl.
*G05D 1/00* (2006.01)
*H04W 24/08* (2009.01)
*H04B 7/185* (2006.01)
*H04W 84/00* (2009.01)
*H04W 84/04* (2009.01)

(52) U.S. Cl.
CPC ........ *H04B 7/18504* (2013.01); *H04W 24/08* (2013.01); *B64C 2201/122* (2013.01); *B64C 2201/146* (2013.01); *H04W 84/005* (2013.01); *H04W 84/045* (2013.01)

(58) Field of Classification Search
CPC ............. H04W 84/005; H04B 7/18504; H04B 7/18502; H04B 7/185; H04B 7/18508; H04B 7/1853; H04B 7/18536; H04B 7/18545; H04B 7/18547; B64C 2201/122; B64C 2201/12; B64C 2201/146; B64C 39/024; G05D 1/0022
See application file for complete search history.

(56) References Cited

U.S. PATENT DOCUMENTS

| | | | |
|---|---|---|---|
| 9,948,380 B1* | 4/2018 | Vos | H04W 24/02 |
| 2004/0009792 A1* | 1/2004 | Weigand | H04W 16/28 |
| | | | 455/561 |
| 2009/0303034 A1* | 12/2009 | Abedi | G06Q 10/04 |
| | | | 340/539.1 |
| 2011/0294499 A1 | 12/2011 | Vikberg et al. | |
| 2014/0355476 A1 | 12/2014 | Anderson et al. | |
| 2014/0369336 A1 | 12/2014 | Prakash et al. | |
| 2015/0312774 A1* | 10/2015 | Lau | H04W 24/10 |
| | | | 455/446 |
| 2015/0334750 A1* | 11/2015 | Mehta | H04W 24/10 |
| | | | 370/329 |
| 2016/0013858 A1* | 1/2016 | Jalali | H04B 7/0695 |
| | | | 370/318 |
| 2016/0028471 A1* | 1/2016 | Boss | H04W 28/0289 |
| | | | 455/406 |
| 2016/0381570 A1* | 12/2016 | Lysejko | H04L 43/0829 |
| | | | 455/562.1 |
| 2017/0257779 A1* | 9/2017 | Zerick | H04W 24/02 |
| 2019/0053121 A1* | 2/2019 | Giloh | H04W 36/30 |
| 2019/0222297 A1* | 7/2019 | Vos | H04B 7/18504 |

FOREIGN PATENT DOCUMENTS

| | | |
|---|---|---|
| WO | WO 98/16078 A2 | 4/1998 |
| WO | WO 2013/174442 A1 | 11/2013 |
| WO | WO 2015/139733 A1 | 9/2015 |

* cited by examiner

METHOD OF PROVIDING AN INCREASE OF COMMUNICATION CAPACITY IN A COMMUNICATIONS SYSTEM

CROSS REFERENCE TO RELATED APPLICATIONS

This application is a 35 U.S.C. § 371 national stage application of PCT International Application No. PCT/EP2016/064175 filed on Jun. 20, 2016, the disclosure and content of which is incorporated by reference herein in its entirety.

TECHNICAL FIELD

The technology disclosed herein relates generally to the field of wireless communications, and in particular to a method of providing an increase of communication capacity in a communications system, a network device, method in an unmanned aerial vehicle, an unmanned aerial vehicle, computer programs and computer program products.

BACKGROUND

In a wireless communications system, a hotspot is a limited area within which a high amount of wireless communication occurs. The hotspot may be part of a geographical area (often denoted cell) that is serviced by a certain access node. The hotspot may be created when a high number of data requests and therefore a significant need for communication resources occurs. The access node cannot meet the demand and the hotspot then temporarily overloads the system and causes unsatisfied users.

Operators of the wireless communications systems may deploy a small cell in areas known beforehand to be hotspots, e.g. at airports, train stations and shopping centers. However, identifying less obvious hotspots may be time consuming and when having located the hotspot, a small cell is typically to be deployed which may also be time consuming as well as expensive.

In another solution for meeting the temporarily overload caused by the hotspot data traffic, the operator may reduce quality of service for the users in the area. This has the obvious disadvantage of, again, resulting in dissatisfied users.

SUMMARY

An objective of the present disclosure is to address and improve various aspects for so called hotspots in a communications system. A particular objective is to enable rapid handling of temporary traffic overload in the system and in an efficient manner. These objectives and others are achieved by the methods, devices, computer programs and computer program products according to the appended independent claims, and by the embodiments according to the dependent claims.

The objective is according to an aspect achieved by a method of providing an increase of communication capacity in a communications system. The method is performed in a network device and comprises: establishing a need for a communication capacity increase in a first coverage area; directing an unmanned aerial vehicle comprising an access node towards the first coverage area; and providing communication resources by the access node of the unmanned aerial vehicle to meet the communication capacity increase in a first coverage area.

The method provides a number of advantages. For instance, the method enables an improved handling of temporary traffic overload in a communications system, in particular caused by hotspots. An advantage provided is improved user satisfaction since by the method enables avoiding loosing user connections even in areas with temporary communication traffic congestion. Still further, the method can rapidly meet an increased need for communication resources.

The objective is according to an aspect achieved by a computer program for a network device for providing increase of communication capacity in a communications system. The computer program comprises computer program code, which, when executed on at least one processor on the network device causes the network device to perform the method as above.

The objective is according to an aspect achieved by a computer program product comprising a computer program as above and a computer readable means on which the computer program is stored.

The objective is according to an aspect achieved by a network device for providing an increase of communication capacity in a communications system. The network device is configured to: establish a need for a communication capacity increase in a first coverage area, direct an unmanned aerial vehicle comprising an access node towards the first coverage area, and provide communication resources by the access node of the unmanned aerial vehicle to meet the communication capacity increase in a first coverage area.

The objective is according to an aspect achieved by a method of providing increase of communication capacity in a communications system. The method is performed in an unmanned aerial vehicle comprising an access node. The method comprises: receiving, from a network device, instructions to fly towards a first coverage area, flying, in response to the received instructions, towards the first coverage area, and providing, by means of the access node, wireless access to users in the first coverage area.

The objective is according to an aspect achieved by a computer program for a unmanned aerial vehicle for providing increase of communication capacity in a communications system. The computer program comprises computer program code, which, when executed on at least one processor on the unmanned aerial vehicle causes the unmanned aerial vehicle to perform the method as above.

The objective is according to an aspect achieved by a computer program product comprising a computer program as above and a computer readable means on which the computer program is stored.

The objective is according to an aspect achieved by a unmanned aerial vehicle for providing increase of communication capacity in a communications system. The unmanned aerial vehicle comprises an access node and is configured to: receive, from a network device, instructions to fly towards a first coverage area, fly, in response to the received instructions, towards the first coverage area, and provide, by means of the access node, wireless access to users in the first coverage area.

Further features and advantages of the embodiments of the present teachings will become clear upon reading the following description and the accompanying drawings.

DETAILED DESCRIPTION

Figure 1:
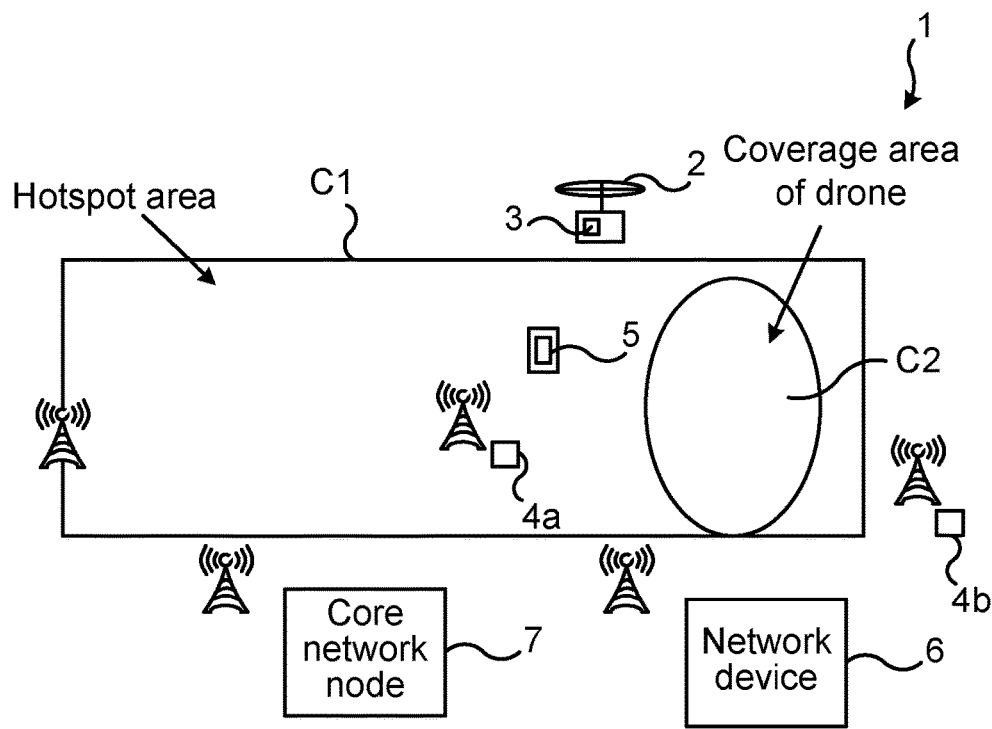
FIG. 1 illustrates schematically an environment in which embodiments according to the present teachings may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, a method is provided, in various embodiments, which detects and locates hotspots, and controls a number of unmanned aerial vehicles with backhaul and access system capabilities for increasing the capacity in the located hotspot area(s) in the communications system. A corresponding method in an unmanned aerial vehicle is also disclosed.

FIG. 1 illustrates an environment in which embodiments according to the present teachings may be implemented. The communications system 1 may be a system conforming to standards such as 3G, 4G or 5G and then accordingly comprises nodes performing functions as defined in such standards. The communications system 1 comprises, for instance, a number of access nodes 4a, 4b arranged for wireless communication with communication devices 5. Such access nodes 4a, 4b are part of an access network and are denoted differently depending on the communications system at hand. The access nodes 4a, 4b are, for instance, known as base stations, radio base stations, evolved NodeBs, eNBs. Each such access node 4a, 4b may serve users located within one or more geographical areas, often denoted cells. For instance, a first access node 4a may serve users located within a certain geographical area.

The communication device 5 may be any type of device adapted for wireless communication provided in the communications system 1, e.g. a user device, a user equipment (UE), tablet, personal computer to mention a few examples.

The communications system 1 may comprise additional network nodes, schematically indicated at reference numeral 7. Such additional network nodes may be core network nodes such as gateways, mobility management entities, home location registers etc.

The communications system 1 comprises unmanned aerial vehicles 2, in the following also denoted drones. The drone 2 is provided with an access node 3 capable of providing wireless access to communication devices 5 as well as providing backhaul capacity. To this end, the access node 3 may comprise processing circuitry, antennas, receiving circuitry, transmitting circuitry etc. that are conventionally used in an access node. The drone 2 may comprise a Global Positioning System (GPS) device for navigation purposes, rotors, power source such as a battery and further devices for enabling it to fly. The drone 2 is further provided with means for implementing a method in accordance with the present teachings (described further later, with reference e.g. to FIGS. 5, 6 and 7).

The communications system 1 comprises a network device 6 for implementing a method, in various embodiments, according to the present teachings. The network device 6 may be part of the access network, e.g. arranged in an access node 4a, 4b, or it may be part of the core network 7. In still other embodiments, the network device 6 is arranged in an external packet data network, e.g. Internet or be provided in the "cloud". The network device 6 may be a server running a sequence of instructions implementing the method, or a virtual server or a virtual machine.

The communications system 1 comprises means for detecting and locating a so-called traffic hotspot. Such means may be a server running a sequence of instructions for such detection and locating, for instance in the access node 4a or in the network device 6. The traffic hotspot is an area in which the communications system 1 is overloaded and the user experience is therefore poor. Such hotspots may be detected and located in various different ways. One exemplary way to detect a user traffic hotspot is to count number of lost connections for a certain access node 4a, and another exemplary way is to detect that the access node 4a, 4b has a resource utilization that meets a certain threshold, e.g. is above a threshold value indicating maximum capacity. The detecting may thus be performed in a number of different ways, and further examples are given later.

An exemplary use case is described next with reference still to FIG. 1. Reference C1 indicates a hotspot area within the communications system 1. In the hotspot area C1 there is a high, or very high traffic load, e.g. due to a large crowd of people using their communication devices 5 within this limited area. In the scenario of FIG. 1, a first access node 4a serves a number of users within a certain coverage area, which has become a hotspot area C1. The communications system 1, e.g. the network device 6 thereof, or an access node thereof 4a, 4b, detects that there is an overload situation, or that there is an imminent risk for an overload situation, caused by the coverage area becoming a hotspot area C1. This may occur rapidly and unexpectedly, e.g. due to an event such as a football game, due to an ad-hoc demonstration, due to a traffic jam or the like.

After having detected and located the hotspot area C1, a drone 2 with the attached access node 3a is signaled. As described earlier, this access node 3a is capable of providing wireless communication access to user devices 5 as well as capable of providing backhaul capacity. According to the method, the drone 2 is directed to the hotspot area for assisting the access node 4a in serving the communication devices 5. The communication system 1 can control the position of the drone 2 such that the drone 2 takes up part of the communication traffic, i.e. takes up some (intended) users and also such that the drone 2 gets a good backhaul connection. The communications system 1 (a node thereof) may determine e.g. by means of triangulation, GPS signaling or other position determination method determine where the users are, and the drone 2 may then be instructed to a suitable location based thereon. In the case illustrated in FIG. 1, the drone 2 is signaled (i.e. instructed) to fly such as to cover a second coverage area C2. The drone 2 may, but need not, be located within the hotspot area C1. In other instances, the drone 2 with the access node 3 is located outside the first coverage area C2 and provides the desired communication capacity by suitably directed antennas, e.g. directional antennas.

The network device 6 may thus direct the drone 2 with the access node 3 to the hotspot area C1 in order to offload some of the traffic. The network device 6 may direct the drone 2 by signaling instructions to the drone 2. Such signaling may be conveyed via one of the access nodes 4*a*, 4*b*. Depending on the implementation and location of the network device 6 within the communications system 1, this may be direct signaling or signaling via e.g. one or more core network nodes and to one (or more) of the access nodes 4*a*, 4*b*.

The second coverage area C2 of the access node 3 on the drone 2 may be of a suitable size, which size may be adaptable. The communication devices 5 located within this coverage area C2 are served through the access node 3 of the drone 2. Thereby, some of the hotspot area C1 is offloaded by the drone 2, and in particular the access node 3 thereof. In order for the drone 2 to efficiently offload traffic it should preferably also be connected to a backhaul link. Such backhaul link can, for instance, be to a satellite or to a nearby fixed backhaul node. As is known, the satellites may have a backhaul link to a core network of a communications system, and such feature may be used in some embodiments. If using a nearby fixed backhaul node, an antenna system with steerable antenna lobes should be included. The fixed backhaul node may then discover backhaul signaling from the access node 3 of the drone 2 and directing a lobe towards the drone 2, and establish a connection to the access node 3 of the drone 2. By comprising and using a steerable antenna array the fixed backhaul node may reach the drone 2 as the drone 2 moves.

The positioning of the drone 2 over the hotspot area C1 may be determined in various different ways. For example, the position may be based on information known and available within the communications system 1, such as information about the deployment, scenario and the current traffic distribution. As another more time-consuming but for some cases also a more accurate way, finding the most appropriate position for the drone 2 comprises performing continuous (or regular or occasional) network measurements during the positioning and in this way a most suitable position can be found with respect to some performance metrics. This may, for instance, be done by trying different positions and measuring user throughput, and when finding the highest user throughput the corresponding position of the drone 2 is selected. The antenna on the drone 2 may also be steerable in order to tune system performance still further.

In an embodiment, several drones 2 comprising access nodes 3 are signaled by the herein provided network device 6 in order to help out with offloading traffic in a hotspot area C1. In this case several drones have to be positioned such that all of them offload at least some parts of the hotspot area C1. The number of required drones and coverage areas of the respective nodes of the drones may be planned so as to cover as much as needed of the hotspot area C1 with no or as little overlap as possible. This may be implemented in many different ways. As a particular example, the drones may be distributed within the hotspot area C1 with a certain minimum distance to each other. The communications system 1 (a node thereof) may request one or more communication devices to report received signal strength from different drone (access nodes thereof) to discover whether or not their coverage areas overlap. The drones may then be redirected accordingly.

In some embodiments, the drones 2 with their respective attached access nodes 3 are located in an energy restoring place, a type of parking accommodation, wherein their batteries can be recharged, when they are not used for the capacity enhancements.

In some embodiments the drone 2 with the attached access node 3 is used to cover an area with temporarily poor signal coverage, which may, for instance, have occurred due to a failure of an access node 4*a*, 4*b* in the communications system 1. In such case the communications system 1 (a particular device thereof) may have detected the access node 4*a*, 4*b* failure and signals to the drone 2 to temporarily cover up for the failed access node 4*a*, 4*b*.

In some embodiments, when the drone 2 is used for enhancing the capacity or coverage in the communications system 1 it temporarily lands on a building in order to reduce its energy consumption needed for staying up in the air. The landing and other flying directing is performed by the network device 6.

In yet other embodiments, in case the hotspot area C1 lasts for a longer time than the battery (or other power source) on the drone 2, multiple drones 2 with attached access nodes 3 are arranged to take turns to help out with serving the hotspot area C1.

In this case the network device 6 may keep track of the battery life of the drones by exchanging information on e.g. battery status with the drone 2 (via nodes of the communications system 1). The communications system 1, e.g. an access node 4*a*, 4*b* thereof, may signal to the drones when it is time for a switch.

In still other embodiments, the access node 4*a* is mounted on an unmanned vehicle moving on sea or on ground, for example a self-driving car.

In yet another embodiment, there is information available beforehand about a hotspot occurring, for example information about a planned concert taking place. In this case the drone 2 with attached access node 3*a* can be sent out in advance of the concert (or other happening) so that it is in place already when the hotspot occurs.

The various embodiments and features that have been described may be combined in many different ways, also in ways not explicitly mentioned herein. Examples of such combinations are given next, with reference first to FIG. 2.

Figure 2:
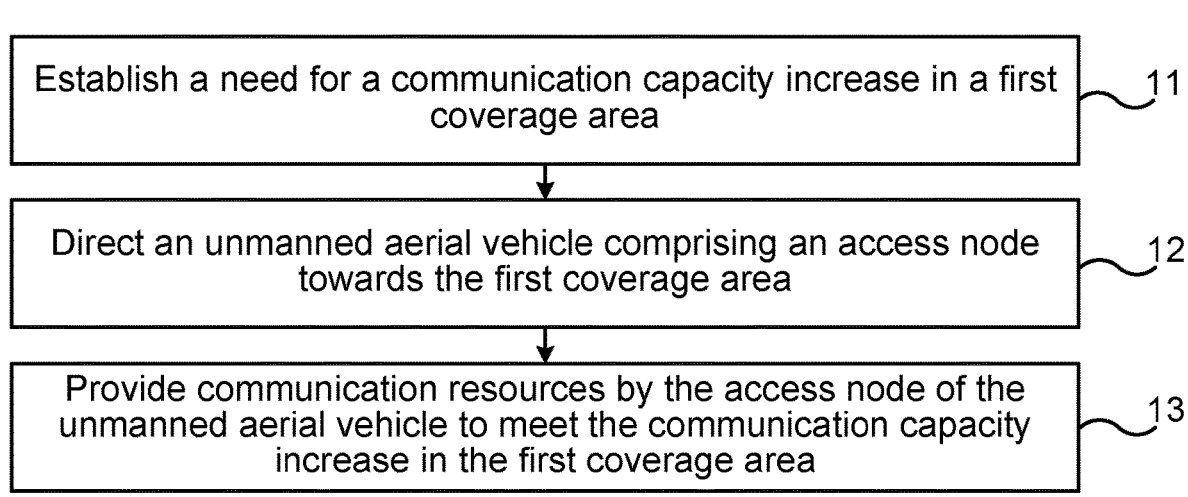
FIG. 2 illustrates a flow chart over steps of an embodiment of a method in a network device in accordance with the present teachings.

FIG. 2 illustrates a flow chart over steps of an embodiment of a method in a network device 6 in accordance with the present teachings.

A method 10 of providing an increase of communication capacity in a communications system 1 is provided. The method 10 may be performed in a network device 6.

The method 10 comprises establishing 11 a need for a communication capacity increase in a first coverage area C1. The establishing 11 may be based on information available beforehand or on information obtained continuously (or regularly) within the communications system 1.

The method 10 comprises directing 12 an unmanned aerial vehicle 2 comprising an access node 3 towards the first coverage area C1. This directing 12 may, for instance, comprise instructing the unmanned aerial vehicle 2 to fly into the first coverage area C1, or at least be within a certain distance to the first coverage area C1 at which the access node 3 is able to communicate with the users within the coverage area C1. The unmanned aerial vehicle 2 may be determined to be sufficiently close to the first coverage area C1, for instance, when the access node 3 has a user throughput meeting a certain threshold value.

The method 10 comprises providing 13 communication resources by the access node 3 of the unmanned aerial vehicle 2 to meet the communication capacity increase in a first coverage area C1.

The providing 13 communication capacity by the access node 3 may, for instance, comprises providing coverage in a second coverage area C2, wherein the second coverage area C2 at least partly overlapping the first coverage area C1. This may be a typical case, i.e. that the unmanned aerial vehicle 2 is positioned such that the coverage area (second coverage area C2) provided by the access node 3 lies within or at least overlaps the overloaded first coverage area C1. However, even by having the access node 3 of the unmanned aerial vehicle 2 provide a coverage that is non-overlapping with the first coverage area C1, in which the increase of communication capacity is needed, the required communication capacity increase may be provided.

The method 10 provides a number of advantages. For instance, by means of the method 10 it is possible to quickly respond to a need for a capacity increase even at distant locations. Such need may be a highly temporary and occur unexpectedly, and by sending out an unmanned aerial vehicle that comprises an access node 3 this need can quickly be met. The need may be established e.g. by detecting and locating a traffic hotspot area C1.

In an embodiment, the establishing 11 comprises detecting and locating a wireless communication hotspot area C1. In other embodiments, there is knowledge beforehand about a hotspot area C1 expected to occur.

In different embodiments, the detecting and locating the traffic hotspot area C1 comprises one of: detecting a user traffic hotspot based on number of lost connections and the locating comprises identifying an access node loosing the connections, detecting an access node providing coverage in the first coverage area C1 to have reduced signal coverage and the locating comprises identifying the access node, detecting an access node providing coverage in the first coverage area C1 to be faulty and the locating comprises identifying the access node, detecting access node 4a, 4b utilization exceeding a threshold value and the locating comprises identifying the access node 4a, 4b, utilization of at least one neighboring access node exceeding a threshold value and the locating comprises identifying the least one neighboring access node, number of users connected to at least one neighboring access node exceeding a threshold value and the locating comprises identifying the at least one neighboring access node. In other embodiments, the detecting a user traffic hotspot may comprise any combination of the above mentioned ways of detecting. For instance, in order for a hotspot to be detected two or more criteria may need to be fulfilled.

In some embodiments, the directing 12 comprises:
determining a position for the unmanned aerial vehicle 2 based on one or more of: information on deployment of the communications system 1, information on current distribution of wireless communication, and information on user throughput, and
instructing the unmanned aerial vehicle 2 to fly to the determined position.

The determining a position for the unmanned aerial vehicle 2 may hence be performed in many different ways, as has also been described earlier. The decision may be based on many different combinations of information, such as distribution of the users, positioning of the users, throughput, quality of service etc.

In some embodiments, the directing 12 comprises:
determining a metric indicative for performance in the first coverage area C1, and
determining, based on the determined metric, a position at which the unmanned aerial vehicle 2 provides highest capacity increase to the first coverage area C1, and
instructing the unmanned aerial vehicle 2 to fly to the determined position.

The metric indicative for performance may, for instance, comprise the network device 6 requesting the access node 4a on such metrics. The access node 4a, 4b may perform suitable measurements and/or request the communications devices to perform and report on e.g. signal strengths.

In an alternative embodiment, the network device 6 instructs the unmanned aerial vehicle 2 to fly to a position such as to enable a communication resource increase in the first coverage area C1, for instance instructing it to fly into or to the vicinity of the first coverage area C1. The network device 6 may, as in the above embodiment obtain metrics on communication performance through e.g. access nodes 4a, 4b of the communications systems to establish whether or not the performance is increased by the drones 2. However, in other embodiments the network device 6 may instruct also the unmanned aerial vehicle 2 to measure a metric indicative for performance in the first coverage area C1 in at least a first and second position of the unmanned aerial vehicle 2. Based on the measured metrics, the network device 6 instructs the unmanned aerial vehicle 2 to fly to the position, of the at least first and second positions, having the metric that indicates highest performance, e.g. highest performance in terms of user throughput.

In some embodiments, the providing 13 comprises providing communication capacity as one or both of user traffic and backhaul traffic. Preferably, the access node 3 of the unmanned aerial vehicle 2 is arranged to handle both user traffic and backhaul traffic, but in some instances it may be arranged to handle only one of user traffic and backhaul traffic.

In some embodiments, the method 10 comprises providing backhaul capacity to the access node 3 of the unmanned aerial vehicle 2 via at least one of: a satellite and a terrestrial backhaul node.

In some embodiments, the establishing 11 comprises determining an unexpected event occurring temporarily and requiring the communication capacity increase in the first coverage area C1.

In some embodiments, the method 10 comprises determining the need for the communication capacity increase having ended and redirecting the unmanned aerial vehicle 2 to a maintenance location.

In some embodiments, the first coverage area C1 comprises a wireless communication hotspot area and the providing 13 comprises offloading, by the access node 3 of the unmanned aerial vehicle 2, wireless communication traffic in at least a second coverage area C2, the second coverage area C2 being part of the first coverage area.

Figure 3:
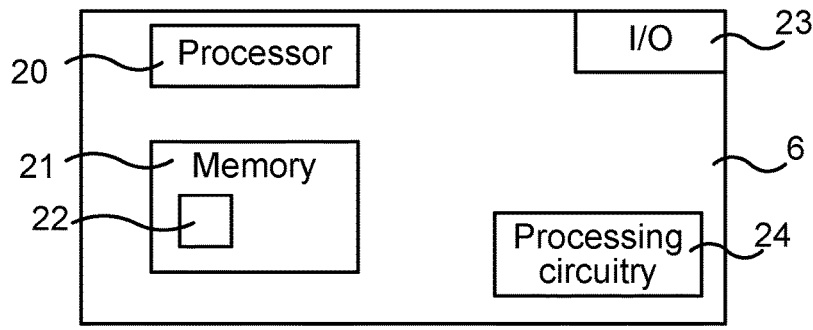
FIG. 3 illustrates schematically a network device and means for implementing embodiments of the method in accordance with the present teachings.

FIG. 3 illustrates schematically a network device and means for implementing embodiments of the method in accordance with the present teachings.

The network device 6 comprises a processor 20 comprising any combination of one or more of a central processing unit (CPU), multiprocessor, microcontroller, digital signal processor (DSP), application specific integrated circuit etc. capable of executing software instructions stored in a memory 21 which can thus be a computer program product. The processor 20 can be configured to execute any of the various embodiments of the method 10 for instance as described in relation to FIG. 2.

The memory 21 of the network device 6 can be any combination of read and write memory (RAM) and read only memory (ROM), Flash memory, magnetic tape, Compact Disc (CD)-ROM, digital versatile disc (DVD), Blu-ray disc etc. The memory 21 may also comprise persistent storage, which, for example, can be any single one or combination of magnetic memory, optical memory, solid state memory or even remotely mounted memory.

The network device 6 may comprise an interface 23 for communication with other devices and/or entities. The interface 23 may, for instance, comprise a protocol stack, for communication with other devices or entities, e.g. with an access node 4a, 4b of the communications system 1. The interface may be used for receiving data input and for outputting data.

The network device 6 may comprise additional processing circuitry 24 for implementing the various embodiments according to the present teachings.

A network device 6 for providing an increase of communication capacity in a communications system is provided. The network device 6 is configured to:

establish a need for a communication capacity increase in a first coverage area C1, direct an unmanned aerial vehicle 2 comprising an access node 3 towards the first coverage area C1, and provide communication resources by the access node 3 of the unmanned aerial vehicle 2 to meet the communication capacity increase in a first coverage area C1.

The network device 6 may be configured to perform the above steps e.g. by comprising one or more processors 20 and memory 21, the memory 21 containing instructions executable by the processor 20, whereby network device 6 is operative to perform the steps.

In an embodiment thus, a network device 6 is provided for providing an increase of communication capacity in a communications system. The network device comprises one or more processors 20 and memory 21, the memory 21 containing instructions executable by the processor 20, whereby the network device is operative to: establish a need for a communication capacity increase in a first coverage area C1, direct an unmanned aerial vehicle comprising an access node towards the first coverage area C1, and provide communication resources by the access node of the unmanned aerial vehicle to meet the communication capacity increase in a first coverage area C1.

In various embodiments, the network device 6 is configured to establish, by detecting and locating, a wireless communication hotspot area C1.

In various embodiments, the detecting and locating the traffic hotspot area C1 comprises one of: detecting a user traffic hotspot based on number of lost connections and the locating comprises identifying an access node 4a loosing the connections, detecting an access node 4a providing coverage in the first coverage area C1 to have reduced signal coverage and the locating comprises identifying the access node, detecting an access node 4a providing coverage in the first coverage area C1 to be faulty and the locating comprises identifying the access node 4a, detecting access node 4a utilization exceeding a threshold value, utilization of at least one neighboring access node exceeding a threshold value, number of users connected to at least one neighboring access node exceeding a threshold value.

In various embodiments, the network device 6 is configured to direct by:

determining a position for the unmanned aerial vehicle 2 based on one or more of: information on deployment of the communications system 1, information on current distribution of wireless communication, information on user throughput, and instructing the unmanned aerial vehicle 2 to fly to the determined position.

In various embodiments, the network device 6 is configured to direct by:

determining a metric indicative for performance in the first coverage area C1, and determining, based on the determined metric, a position at which the unmanned aerial vehicle 2 provides highest capacity increase to the first coverage area C1, and instructing the unmanned aerial vehicle 2 to fly to the determined position.

In various embodiments, the network device 6 is configured to provide by providing communication capacity as one or both of user traffic and backhaul traffic.

In various embodiments, the network device 6 is configured to provide backhaul capacity to the access node 3 of the unmanned aerial vehicle 2 via at least one of: a satellite and a terrestrial backhaul node.

In various embodiments, the network device 6 is configured to establish by determining an unexpected event occurring temporarily requiring the communication capacity increase in the first coverage area C1.

In various embodiments, the network device 6 is configured to determine the need for the communication capacity increase having ended and redirecting the unmanned aerial vehicle 2 to a maintenance location.

In various embodiments, the first coverage area C1 comprises a wireless communication hotspot area and the network device 6 is configured to provide by offloading, by the access node 3 of the unmanned aerial vehicle 2, wireless communication traffic in at least a second coverage area C2, the second coverage area C2 being part of the first coverage area.

The present teachings also encompass a computer program 22 for a network device 6 for providing an increase of communication capacity in a communications system. The computer program 22 comprises computer program code, which, when executed on at least one processor on the network device 6, causes the network device 6 to perform the method 10 according to any of the described embodiments.

The present teachings also encompass computer program products 21 for a network device 6 for providing an increase of communication capacity in a communications system. The computer program product 21 comprises the computer program 22 for implementing the embodiments of the methods as described, and a computer readable means on which the computer program 22 is stored. The computer program product, or the memory, thus comprises instructions executable by the processor 20. Such instructions may be comprised in a computer program, or in one or more software modules or function modules. The computer program product 21 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 4:
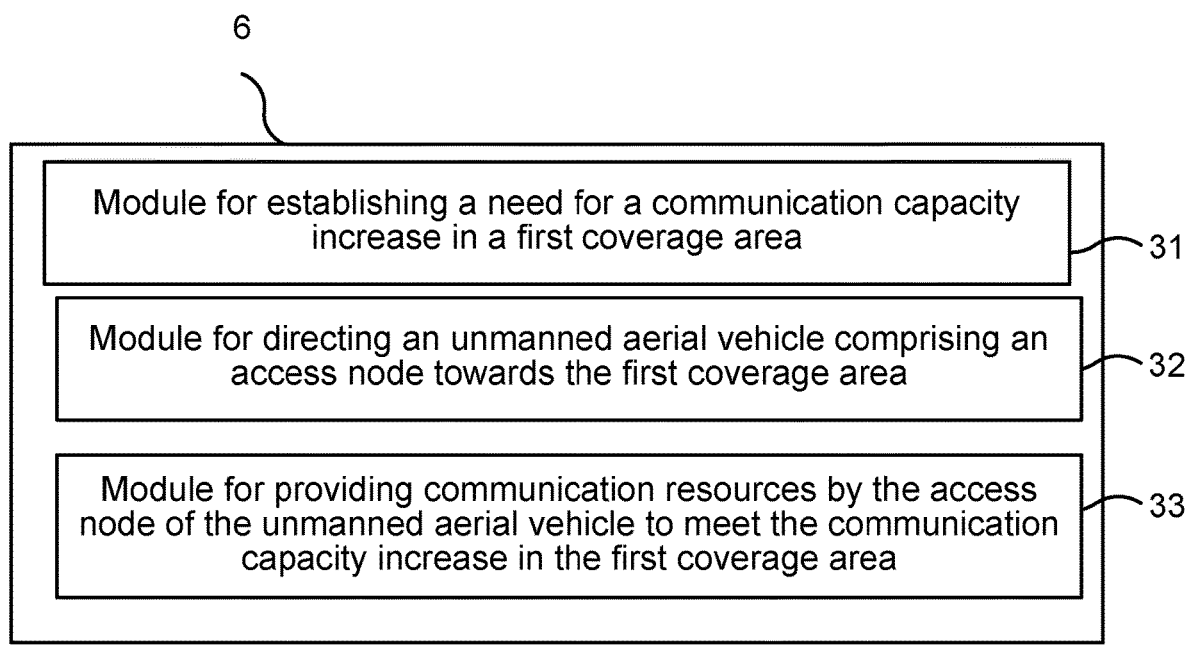
FIG. 4 illustrates a network device comprising function modules/software modules for implementing embodiments of the present teachings.

FIG. 4 illustrates a network device 6 comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 10 that has been described in various embodiments.

A network device 6 is provided for providing an increase of communication capacity in a communications system.

The network device comprises a first module 31 for establishing a need for a communication capacity increase in a first coverage area. Such first module 31 may, for instance, comprise processing circuitry adapted to establish such need. The processing circuitry may be adapted to receive information based on which the processing circuitry determines capacity increase.

The network device 6 comprises a second module 32 for directing an unmanned aerial vehicle comprising an access node towards the first coverage area. Such second module 32 may, for instance, comprise a communication module, and/or receiving circuitry and/or transmitting circuitry for signaling directions to the unmanned aerial vehicle.

The network device 6 comprises a third module 33 for providing communication resources by the access node of the unmanned aerial vehicle to meet the communication capacity increase in a first coverage area. Such third module 33 may, for instance, comprise receiving and/or transmitting circuitry.

It is noted that one or more of the modules 31, 32, 33 may be replaced by units.

Figure 5:
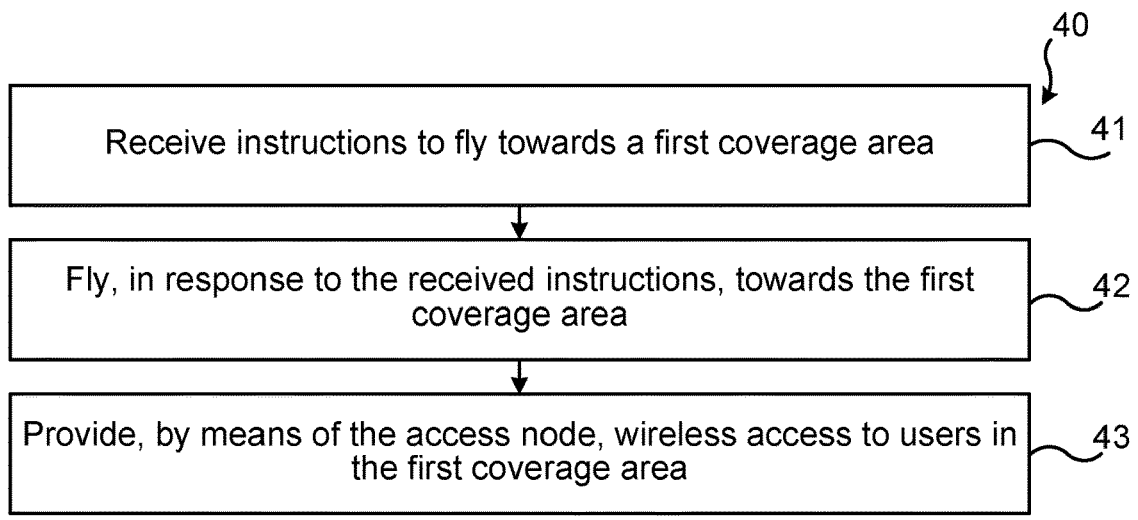
FIG. 5 illustrates a flow chart over steps of an embodiment of a method in an unmanned aerial vehicle in accordance with the present teachings.

FIG. 5 illustrates a flow chart over steps of an embodiment of a method in an unmanned aerial vehicle in accordance with the present teachings.

A method 40 of providing increase of communication capacity in a communications system 1 is provided. The method 40 may be performed in an unmanned aerial vehicle 2 comprising an access node 3. The method 40 comprises:
  receiving 41, from a network device 6, instructions to fly towards a first coverage area C1,
  flying 42, in response to the received instructions, towards the first coverage area C1, and
  providing 43, by means of the access node 3, wireless access to users in the first coverage area C1.
In an embodiment, the receiving 41 comprises:
  receiving instructions to fly towards the first coverage area C1,
  receiving instructions to measure a metric indicative for performance in the first coverage area C1 in at least a first and second position, and
  receiving instructions to fly to the position, of the at least first and second positions, having the metric indicating highest performance.

The method 40 being performed by an unmanned aerial vehicle 2 is a convenient way of rapidly increase communication resources in a particular area. Advantages corresponding to the ones mentioned in relation to FIG. 2 are obtained also for the method 40 performed in the unmanned aerial vehicle 2.

Figure 6:
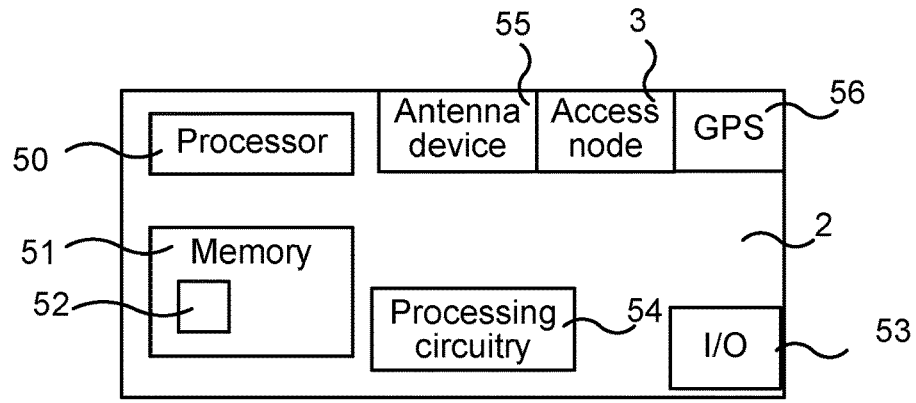
FIG. 6 illustrates schematically an unmanned aerial vehicle and means for implementing embodiments of the method in accordance with the present teachings.

FIG. 6 illustrates schematically an unmanned aerial vehicle 2 and means for implementing embodiments of the method in accordance with the present teachings.

The unmanned aerial vehicle 2 comprises a processor 50 comprising any combination of one or more of a central processing unit (CPU), multiprocessor, microcontroller, digital signal processor (DSP), application specific integrated circuit etc. capable of executing software instructions stored in a memory 51 which can thus be a computer program product. The processor 50 can be configured to execute any of the various embodiments of the method 40 for instance as described in relation to FIG. 5.

The memory 51 of the unmanned aerial vehicle 2 can be any combination of read and write memory (RAM) and read only memory (ROM), Flash memory, magnetic tape, Compact Disc (CD)-ROM, digital versatile disc (DVD), Blu-ray disc etc. The memory 51 may also comprise persistent storage, which, for example, can be any single one or combination of magnetic memory, optical memory, solid state memory or even remotely mounted memory.

The unmanned aerial vehicle 2 may comprise an interface 53 for communication with other devices and/or entities. The interface 53 may, for instance, comprise a protocol stack, for communication with other devices or entities, e.g. with an access node 4a, 4b of the communications system 1 and with the network device 6 (possibly via other nodes such as the access node 4a, 4b of the communications system 1). The interface may be used for receiving data input and for outputting data.

The unmanned aerial vehicle 2 comprises an access node 3, which may be a smaller version of a conventional access node 4a of the communications system 1. The access node 3 is able to communicate with the access nodes 4a, 4b of the communications system 1, and in some embodiments also with satellites (e.g. for enabling it to provide backhaul capacity to its coverage area) and fixed backhaul nodes.

For enabling the wireless communication, the unmanned aerial vehicle 2 (and/or the access node 3 thereof), comprises an antenna device 55. As mentioned earlier, such antenna may, for instance, be a directional antenna. Further, radio chains, components and circuitry for receiving and transmitting signaling are also provided.

The unmanned aerial vehicle 2 may, may as mentioned earlier, also comprise a GPS 56 and still further components enabling it to fly.

The unmanned aerial vehicle 2 may comprise additional processing circuitry 54 for implementing the various embodiments according to the present teachings.

An unmanned aerial vehicle 2 for providing increase of communication capacity in a communications system 1 is provided. The unmanned aerial vehicle 2 comprises an access node 3 and is configured to:
  receive, from a network device 6, instructions to fly towards a first coverage area C1,
  fly, in response to the received instructions, towards the first coverage area C1, and
  provide, by means of the access node 3, wireless access to users in the first coverage area C1.

The unmanned aerial vehicle 2 may be configured to perform the above steps e.g. by comprising one or more processors 50 and memory 51, the memory 51 containing instructions executable by the processor 50, whereby unmanned aerial vehicle 2 is operative to perform the steps.

In an embodiment thus, a unmanned aerial vehicle is provided for providing an increase of communication capacity in a communications system. The unmanned aerial vehicle comprises one or more processors and memory, the memory containing instructions executable by the processor, whereby the unmanned aerial vehicle is operative to: receive, from a network device, instructions to fly towards a first coverage area, fly, in response to the received instructions, towards the first coverage area, and provide, by means of the access node, wireless access to users in the first coverage area.

In an embodiment, the unmanned aerial vehicle 2 is configured to receive by:
  receiving instructions to fly towards the first coverage area C1,
  receiving instructions to measure a metric indicative for performance in the first coverage area C1 in at least a first and second position, and
  receiving instructions to fly to the position, of the at least first and second positions, having the metric indicating highest performance.

The present teachings also encompass a computer programs for an unmanned aerial vehicle 2 for providing an increase of communication capacity in a communications system. The computer program 52 comprises computer program code, which, when executed on at least one processor on the unmanned aerial vehicle 2, causes the unmanned aerial vehicle 2 to perform the method 40 according to any of the described embodiments.

The present teachings also encompass computer program products 51 for an unmanned aerial vehicle 2 for providing an increase of communication capacity in a communications system. The computer program product 51 comprises the computer program 52 for implementing the embodiments of the methods as described, and a computer readable means on which the computer program 52 is stored. The computer program product, or the memory, thus comprises instructions executable by the processor 50. Such instructions may be comprised in a computer program, or in one or more software modules or function modules. The computer program product 51 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 7:
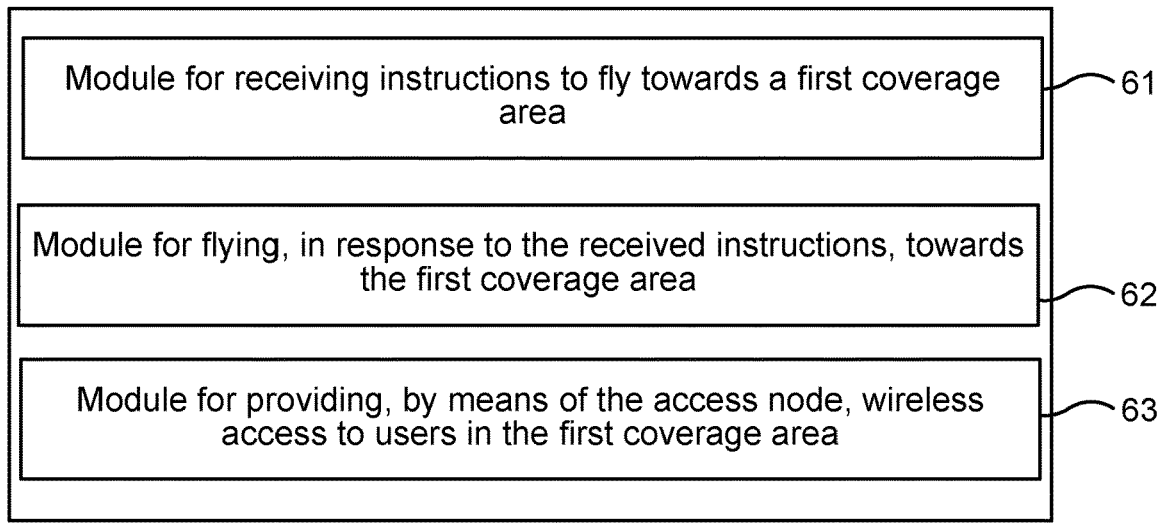
FIG. 7 illustrates an unmanned aerial vehicle comprising function modules/software modules for implementing embodiments of the present teachings.

FIG. 7 illustrates an unmanned aerial vehicle comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 10 that has been described in various embodiments.

A network device 6 is provided for providing an increase of communication capacity in a communications system. The network device comprises a first module 31 for establishing a need for a communication capacity increase in a first coverage area. Such first module 31 may, for instance, comprise processing circuitry adapted to establish such need. The processing circuitry may be adapted to receive information based on which the processing circuitry determines capacity increase.

An unmanned aerial vehicle is provided for providing increase of communication capacity in a communications system. The unmanned aerial vehicle comprises an access node. The unmanned aerial vehicle comprises a first module 61 for receiving, from a network device, instructions to fly towards a first coverage area. Such first module 61 may, for instance, comprise receiving circuitry and/or antenna device.

The unmanned aerial vehicle comprises a second module 62 for flying, in response to the received instructions, towards the first coverage area. Such second module 62 may, for instance, comprise processing circuitry adapted to effectuate received flying instructions, such as to direct the unmanned aerial vehicle to intended position.

The unmanned aerial vehicle comprises a third module 63 for providing, by means of the access node, wireless access to users in the first coverage area. Such third module 63 may, for instance, comprise processing circuitry for controlling the access node.

It is noted that one or more of the modules 61, 62, 63 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method of providing an increase of communication capacity in a communications system, the method being performed by a processor in a network device and comprising:
   establishing a need for a communication capacity increase in a first coverage area C1,
   directing, through communications via a communication interface, an unmanned aerial vehicle comprising an access node towards the first coverage area C1,
   providing communication resources by the access node of the unmanned aerial vehicle to meet the communication capacity increase in the first coverage area C1,
   during a fine positioning phase to find a most suitable position for the unmanned aerial vehicle within the first coverage area C1:
   directing, through communications via the communication interface, the unmanned aerial vehicle to fly to a plurality of spaced apart positions that are within the first coverage area C1, perform corresponding measurements of user throughput through the access node relaying communications between at least one user and a backhaul node at each of the plurality of spaced apart positions, and report the measurements of user throughput to the network device,
   receiving the measurements of user throughput from the unmanned aerial vehicle,
   selecting the most suitable position within the first coverage area C1 as one of the plurality of spaced apart positions that corresponds to a highest one of the measurements of user throughput, and
   directing an antenna system, with steerable antenna lobes, which is connected to the backhaul node and can be directed to provide communication resources to the first coverage area C1, to steer one of the antenna lobes towards the selected most suitable position for the unmanned aerial vehicle, and directing, through communications via the communication interface, the unmanned aerial vehicle to be positioned at the selected most suitable position within the first coverage area C1 while relaying communications through the access node between users and the backhaul node.

2. The method as claimed in claim 1, wherein the establishing comprises detecting and locating a wireless communication hotspot area C1.

3. The method as claimed in claim 2, wherein the detecting and locating the wireless communication hotspot area C1 comprises one of: detecting a user traffic hotspot based on number of lost connections and the locating comprises identifying an access node losing the connections, detecting an access node providing coverage in the first coverage area C1 to have reduced signal coverage and the locating comprises identifying the access node, detecting an access node providing coverage in the first coverage area C1 to be faulty and the locating comprises identifying the access node, detecting access node utilization exceeding a threshold value, utilization of at least one neighboring access node exceeding a threshold value, number of users connected to at least one neighboring access node exceeding a threshold value.

4. The method as claimed in claim 1, wherein the directing comprises:

determining a position for the unmanned aerial vehicle based on one or more of: information on deployment of the communications system, information on current distribution of wireless communication, information on user throughput, and instructing the unmanned aerial vehicle to fly to the determined position.

5. The method as claimed in claim 1, wherein the directing comprises:

determining a metric indicative for performance in the first coverage area C1, and determining, based on the determined metric, a position at which the unmanned aerial vehicle provides highest capacity increase to the first coverage area C1, and instructing the unmanned aerial vehicle to fly to the determined position.

6. The method as claimed in claim 1, wherein the providing comprises providing communication capacity as one or both of user traffic and backhaul traffic.

7. The method as claimed in claim 1, comprising providing backhaul capacity to the access node of the unmanned aerial vehicle via at least one of: a satellite and a terrestrial backhaul node.

8. The method as claimed in claim 1, wherein the establishing comprises determining an unexpected event occurring temporarily requiring the communication capacity increase in the first coverage area C1.

9. The method as claimed in claim 1, wherein the first coverage area C1 comprises a wireless communication hotspot area and wherein the providing comprises offloading, by the access node of the unmanned aerial vehicle, wireless communication traffic in at least a second coverage area C2, the second coverage area C2 being part of the first coverage area.

10. A computer program product for a network device for providing increase of communication capacity in a communications system, the computer program product comprising a non-transitory computer readable medium storing computer program code, which, when executed on at least one processor on the network device causes the network device to perform the method according to claim 1.

11. A network device for providing an increase of communication capacity in a communications system, the network device comprising:

a communication interface operable to communicate with an unmanned aerial vehicle;

a processor; and a memory storing program code executable by the processor to:

establish a need for a communication capacity increase in a first coverage area C1, direct, through communications via the communication interface, an unmanned aerial vehicle comprising an access node towards the first coverage area C1, and provide communication resources by the access node of the unmanned aerial vehicle to meet the communication capacity increase in the first coverage area C1, during a fine positioning phase to find a most suitable position for the unmanned aerial vehicle within the first coverage area C1:

direct, through communications via the communication interface, the unmanned aerial vehicle to fly to a plurality of spaced apart positions that are within the first coverage area C1, perform corresponding measurements of user throughput through the access node relaying communications between at least one user and a backhaul node at each of the plurality of spaced apart positions, and report the measurements of user throughput to the network device, receive the measurements of user throughput from the unmanned aerial vehicle, select the most suitable position within the first coverage area C1 as one of the plurality of spaced apart positions that corresponds to a highest one of the measurements of user throughput, and direct an antenna system, with steerable antenna lobes, which is connected to the backhaul node and can be directed to provide communication resources to the first coverage area C1, to steer one of the antenna lobes towards the selected most suitable position for the unmanned aerial vehicle, and direct, through communications via the communication interface, the unmanned aerial vehicle to be positioned at the selected most suitable position within the first coverage area C1 while relaying communications through the access node between users and the backhaul node.

12. The network device as claimed in claim 11, configured to establish by detecting and locating a wireless communication hotspot area C1.

13. The network device as claimed in claim 12, wherein the detecting and locating the wireless communication hotspot area C1 comprises one of: detecting a user traffic hotspot based on number of lost connections and the locating comprises identifying an access node losing the connections, detecting an access node providing coverage in the first coverage area C1 to have reduced signal coverage and the locating comprises identifying the access node, detecting an access node providing coverage in the first coverage area C1 to be faulty and the locating comprises identifying the access node, detecting access node utilization exceeding a threshold value, utilization of at least one neighboring access node exceeding a threshold value, number of users connected to at least one neighboring access node exceeding a threshold value.

14. The network device as claimed in claim 11, configured to direct by:

determining a position for the unmanned aerial vehicle based on one or more of: information on deployment of the communications system, information on current distribution of wireless communication, information on user throughput, and instructing the unmanned aerial vehicle to fly to the determined position.

15. The network device as claimed in claim 11, configured to direct by:

determining a metric indicative for performance in the first coverage area C1, and determining, based on the determined metric, a position at which the unmanned aerial vehicle provides highest capacity increase to the first coverage area C1, and instructing the unmanned aerial vehicle to fly to the determined position.

* * * * *